US012346374B2

(12) United States Patent
Nir et al.

(10) Patent No.: US 12,346,374 B2
(45) Date of Patent: Jul. 1, 2025

(54) GRAPH-BASED VIDEO INDEXING TO SUPPORT QUERYING WITH IMPLICIT RELATIONS

(71) Applicant: Microsoft Technology Licensing, LLC, Redmond, WA (US)

(72) Inventors: Oron Nir, Herzeliya (IL); Ika Bar-Menachem, Herzeliya (IL); Inbal Sagiv, Kfar Saba (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/067,294

(22) Filed: Dec. 16, 2022

(65) Prior Publication Data

US 2024/0202240 A1  Jun. 20, 2024

(51) Int. Cl.
| | | |
|---|---|---|
| *G06F 16/735* | (2019.01) | |
| *G06F 16/71* | (2019.01) | |
| *G06F 16/738* | (2019.01) | |
| *G06F 16/783* | (2019.01) | |

(52) U.S. Cl.
CPC ............ *G06F 16/735* (2019.01); *G06F 16/71* (2019.01); *G06F 16/738* (2019.01); *G06F 16/784* (2019.01)

(58) Field of Classification Search
CPC ..... G06F 16/685; G06F 16/738; G06F 16/735
USPC ......... 770/722; 707/722, 706, 707, 711, 799
See application file for complete search history.

(56) References Cited

U.S. PATENT DOCUMENTS

| | | |
|---|---|---|
| 10,560,734 B2 | 2/2020 | Jassin et al. |
| 10,902,288 B2 | 1/2021 | Nir et al. |
| 10,936,630 B2 | 3/2021 | Ronen et al. |
| 2021/0081699 A1 | 3/2021 | Ronen et al. |
| 2021/0216717 A1* | 7/2021 | Wang .................. G06F 16/3344 |

(Continued)

FOREIGN PATENT DOCUMENTS

WO   2021151485 A1   8/2021

OTHER PUBLICATIONS

"Wikidata: List of properties/symmetric relation", Retrieved From https://www.wikidata.org/wiki/Wikidata:List_of_properties/symmetric_relation, Feb. 13, 2021, 2 Pages.

(Continued)

*Primary Examiner* — Baoquoc N To
(74) *Attorney, Agent, or Firm* — Holzer Patel Drennan

(57) ABSTRACT

A video indexing system generates descriptive metadata for a video including identifiers for each of multiple detections that each correspond to a select one of multiple subjects that appear in the video. These detections are used to create relational graph data for the video, where the relational graph data includes nodes corresponding to each of the multiple subjects that appear in the video. A knowledge graph is queried with unique identifiers corresponding to the multiple subjects of the video to retrieve implicit relational data for each of the multiple subjects, and a merged relational graph is created by merging the implicit relational data retrieved from the knowledge graph with the relational graph data created for the video. A search engine uses the merged relational graph to identify video content relevant to a user query that is based on an implicit relation. Search results identifying the relevant content are presented on a user device.

17 Claims, 8 Drawing Sheets

(56) References Cited

U.S. PATENT DOCUMENTS

2022/0188661 A1* 6/2022 Tappin .................. G06F 16/248
2022/0222469 A1* 7/2022 Rao ...................... G06V 10/764

OTHER PUBLICATIONS

"Wikidata: List of properties/Wikidata qualifier", Retrieved From https://www.wikidata.org/wiki/Wikidata:List_of_properties/Wikidata_qualifier, Dec. 6, 2022, 17 Pages.
Nir, et al., "CAST: Character labeling in Animation using Self-supervision by Tracking", In Repository of arXiv:2201.07619v1, Jan. 19, 2022, 19 Pages.
International Search Report and Written Opinion received for PCT Application No. PCT/US2023/081487, Mar. 7, 2024, 12 pages.
Said Olfa Ben et al., "An Automatic System to Enhance Videos for a Learning Experience, Using an Interlinking Technique", Journal of Software, vol. 17, Issue. 5, Sep. 1, 2022, pp. 192-206.

* cited by examiner

GRAPH-BASED VIDEO INDEXING TO SUPPORT QUERYING WITH IMPLICIT RELATIONS

BACKGROUND

The rise of cloud storage platforms has led to the development of massive cloud-based video databases. However, media files are unstructured and thus, not searchable in traditional ways. Today, companies annotate media files with searchable metadata that is generated either manually or via artificial intelligence (AI). For example, a video indexing platform may execute object and character recognition algorithms to generate textual data that is descriptive of the video content, such as a textual transcript of video audio, video title, keywords categorizing topics of the video and/or tags that identifying subjects featured in the video. All of this text-based data is stored in association with the video such that it can be searched to identify whether the video is relevant to a user-initiated text-based query. These existing video indexing efforts work well in scenarios where search query keywords happen to tightly correlate with annotations included in video metadata, such as when a user search is directed to a video subject or topic with which the video is tagged.

SUMMARY

According to one implementation, a video indexing and search system generates descriptive metadata for a video. The descriptive metadata includes identifiers for each of multiple detections corresponding to subjects that appear in the video. Relational graph data is generated for the video and includes nodes corresponding to each of the subjects that appear in the video. A knowledge graph is queried with unique identifiers corresponding to the subjects that appear in the video to retrieve implicit relational data for each of the multiple subjects. A merged relational graph is then generated by merging the implicit relational data retrieved from the knowledge graph with the relational graph data created for the video. The merged relational graph is subsequently accessed and analyzed to identify video content relevant to a user query that references an implicit relation for a select subject of interest. Search results identifying the video content are presented on a user device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

Figure 1:
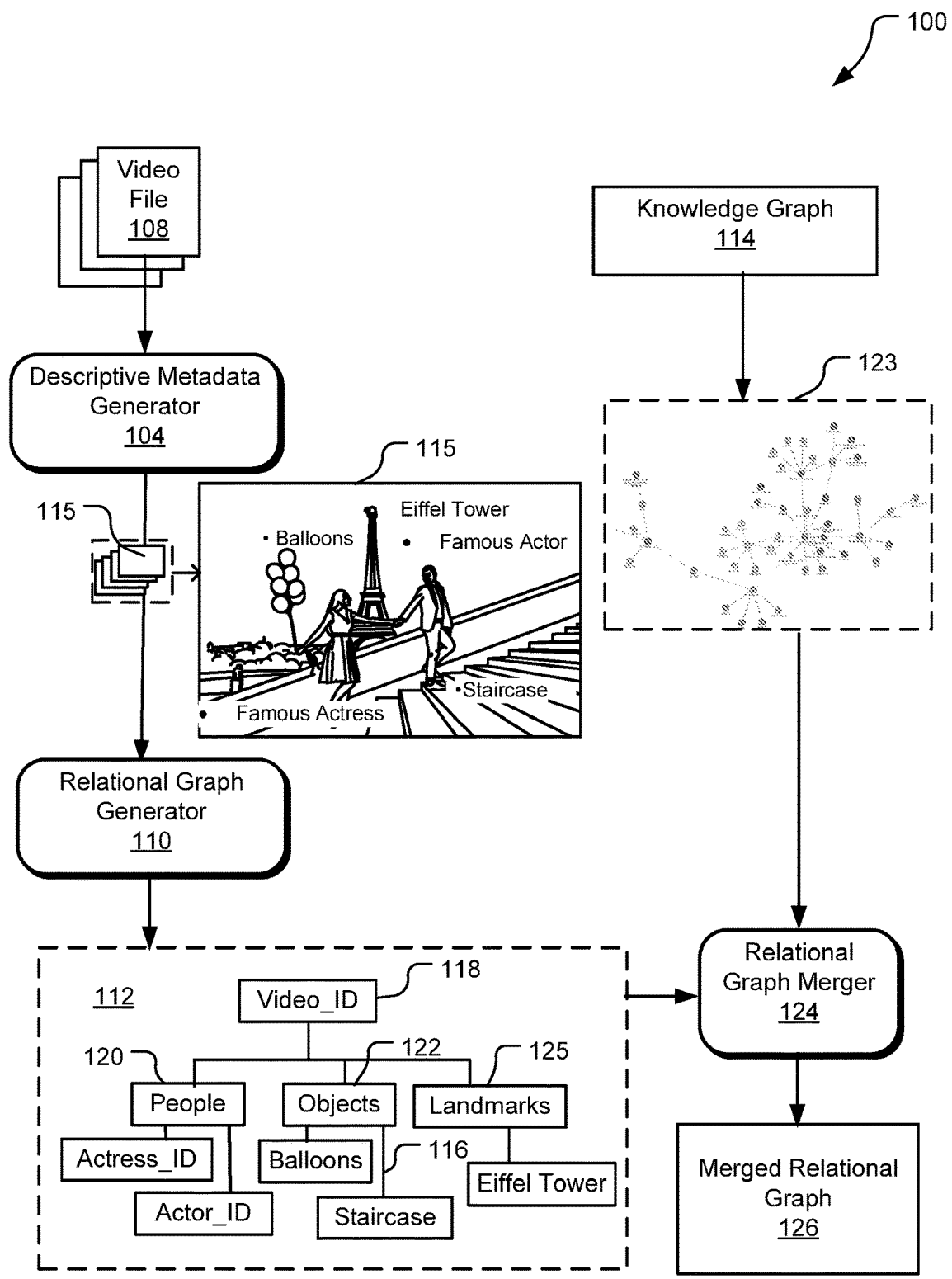
FIG. 1 illustrates aspects of an example video indexing system that creates searchable relational graph data that stores implicit relations pertaining to individual videos and the subjects featured in those videos.

Traditional video indexing methods are limited by the breadth of searchable video metadata generated in association with each video. In most applications, video metadata is limited to descriptors of video content, which typically includes information such as the subjects, objects, landmarks featured in the video, the topic of the video, and audio transcript of words spoken in the video. However, there exist a number of scenarios where a user may wish to search a video database based on some type of relation—either between subjects of a same video or between a video subject and other subjects or objects in the world. Current video search applications do not support AI extraction of implicit references from descriptive metadata. Consequently, it is difficult or impossible to effectively search for video content with references to implicit relations.

For example, a user may wish to search for videos featuring actors that have twins in real life or for videos in which real-life twins play the same character. If the relation of interest (e.g., the actor has a twin) is not descriptive of the video content, it is unlikely to be reflected in the video metadata. Consequently, it is difficult to find videos with subjects that satisfy this implicit relation.

In another example, a user may want to search for videos that feature multiple football players that played for the same team at some point in the careers (e.g., even if decades apart). In this case, even if the names of two football players are included in the video metadata for a particular video, the video metadata is unlikely to include a complete career biography for the players and thus may provide an insufficient basis for determining whether or not the two players ever played for the same team.

The herein disclosed technology leverages AI-based video recognition capabilities (e.g., like implemented into Azure Video Indexer®), and a knowledge base (e.g., an open source knowledge base, such as the Wikimedia® knowledge graph), to provide a video search tool with implicit semantic referential query capabilities that go beyond the explicit annotations available in descriptive metadata of the media file. In one implementation, the disclosed video indexing system generates a relational graph for each of multiple videos. The relational graph is initially populated, for each video, with information from the video's descriptive metadata, such as subjects (e.g., (e.g., people, objects, landmarks) identified within the video. The relational graph is then expanded to include implicit relations of those entities by extracting, from a third-party knowledge base, facts and relations pertaining to each of entities that effectively enrich the available knowledge for the detected entity. Consequently, each video is, essentially, an entity that is itself searchable within a relational graph featuring subjects that are also searchable along with the implicit relations of those subjects both with respect to one another and with respect to other subjects within the world external to the video.

FIG. 1 illustrates aspects of a video indexing system 100 that creates searchable relational graph data that stores implicit relations (e.g., facts) about individual videos and the subjects featured in those videos. This relational graph data is stored in association with the referenced videos such that a search engine can, in response to a user query (e.g., a text and/or image-based user query), search the relational graph data for videos and/or specific locations in videos that are relevant to the query even if the query references one or more implicit relations that are not directly descriptive of video content.

As used herein, an "implicit relation" for a video refers to a relation pertaining to a video or one or more subjects of the video that is not evident from viewing the video without access to an external data source. Stated differently, an individual watching the video and describing what is shown in each scene or frame would not, without external knowledge, be aware of the implicit relation. In contrast, explicit relations are relations pertaining to a video or one or more subjects of the video that are evident from analyzing the video itself, including the visual, textual, and/or audio components of the video file.

Descriptive metadata is used herein to refer to data that is descriptive of the video content—such as keywords, topics, and other textual descriptions—that can be generated manually or by AI that analyzes video content (e.g., data generated by speech-to-text translations, optical character recognition, facial and object recognition). In some cases, descriptive metadata may capture certain types of explicit relations that pertain somewhat indirectly to video content. For example, an analysis of movie credits may allow for creation of metadata that indicates who directed the video, the year the video was released, and more. However, these types of relations are, in the following disclosure, considered to be explicit relations because they can be gleaned from the video, textual (e.g., captions or transcript), and/or audio components of the video file.

In contrast, examples of implicit relations include, for example, biographical facts about an actor (e.g., other films the actor has starred in, where the actor was born, family members of the actor) or historical or geographical facts about an object, landmark, or location featured in the video, and other facts that cannot be known from an analysis of the video file.

The video indexing system 100 includes software elements that perform various operations to support indexing and/or searching in various implementations. In one implementation, each individual video (e.g., a video file 108) input to the system 100 is processed by a descriptive metadata generator 104. The descriptive metadata generator 104 includes various AI models that analyze and/or extract different types of data from the video file 108 to derive various descriptive insights. These AI models may, for example, include object recognition software, facial identification software, speech detection software to create searchable transcripts, optical character recognition (OCR) software to extract text and logos included in the video, and other AI design to analyze video scenes to infer video topics, actions performed in the video, and more. In one implementation, the descriptive metadata generator 104 generates some metadata that is frame-specific. For example, a given video frame 115 in the video 108 may be tagged with descriptors of individual subjects, objects, and landmarks detected in the frame (e.g., "person," "crosswalk", "bus," "building"), labels describing a scene as a whole (e.g., "city at night," "busy city sidewalk"), action identifiers (e.g., "sliding into home plate"), inferred object sizes, relative positions, and more. The subject matter corresponding to each descriptor is referred to herein as a "detections"—e.g., a recognized subject, object, place, thing, or action depicted in a single video frame.

In other implementations, descriptive metadata is added to the video file 108 manually or by software components with characteristics different than those described above.

By example, FIG. 1 shows that the descriptive metadata generator 104 generates descriptive metadata for the video 108 that includes tags for different specific subjects (e.g., animals, people, objects, landmarks) that are depicted in a video frame 115. Here, the tags include keywords corresponding to various inanimate subjects in the frame (e.g., "balloons," "staircase," "Eiffel tower") as well as the names of a featured actress and actor that appear in the frame (e.g., names determined via facial recognition and mapping to a database of faces including famous people).

The descriptive metadata generated across all frames of the video 108 is input to a relational graph generator 110 that, in turn, translates the metadata into a relational graph 112. In one implementation, the relational graph 112 is a graph type used by a commonly-used graph model, such as a Resource Description Framework (RDF) graph or a property graph. In different implementations, the relational graph 112 may be structured in different ways. In general, however, the relational graph 112 includes nodes corresponding to the video subjects or "entities" (e.g., objects, landmarks, humans, animals, and other tagged items), with connections between nodes being indicative of relationships between those nodes. In one implementation, each node in the relational graph 112 is assigned a unique identifier. In FIG. 1, it is assumed that the node identification scheme implemented in the relational graph 112 is identical to a node identification scheme implemented by a knowledge base 114 that is used as a secondary data source to further populate the relational graph 112 (as is discussed in further detail below). Still other implementations employ available mechanism(s) to translate the node identification schemes, such as using a model trained for ontology matching that is capable of identifying a 1-to-1 matching between certain nodes that mutually exist in both databases.

Although the relational graph 112 may take on slightly different forms in different implementations, the relational graph 112 is shown to include a main node 118 that includes a unique identifier for the video, nodes 120, 122, 125 corresponding to different classes of descriptors (e.g., actors, objects, landmarks), and nodes corresponding to the subjects identified within the video that are each linked, by a corresponding edge (e.g., an edge 116) to their associated classification (e.g., actor, object, or landmark). In some implementations, the relations between entities (e.g., nouns) are also represented as nodes, as in an RDF graph. For simplicity, the relational graph 112 is limited to the metadata shown above with respect to video frame 115. The actual relational graph 112 for the full video 108 understandably may include descriptors pertaining to all frames of the video 108.

To enrich the relational graph 112 with implicit referential data, the system 100 queries a knowledge graph 114 to retrieve expansive relational data 122 for some or all nodes in the relational graph 112. The knowledge graph 114 is a knowledge base (e.g., a third-party open source library) that uses a graph-structured data model or topology to integrate data. Although a variety of different types of knowledge graphs may include relational data usable to expand and enrich the relational graph 112, the knowledge graph 114 is, in one implementation of the disclosed technology, the Wikidata® knowledge graph, which acts as central storage for the structured data of various projects owned by Wikimedia®, including Wikipedia®, Wikivoyage®, Wiktionary®, Wikisource®, and others.

Importantly, the relational graph 112 and knowledge graph 114 both utilize a same type of graph model and a common set of entity identifiers. In this sense, a common query language can be used to pull relevant data from both the relational graph 112 and the knowledge graph 114. For example, the knowledge graph 114 may be queried to return all relational data for each node in the relational graph 112. In this case, the relational graph 112 is expanded to include an extensive web of information pertaining to each individual node. For example, a query to the knowledge graph 114 pertaining to the subject "Eiffel tower" may, for example, return historical information about the Eiffel tower, other movies featuring the Eiffel tower and relational data for those movies, geographical and historical data about the city of Paris, famous persons that lived in Paris, etc. Likewise, a query of the knowledge graph 114 for data pertaining to a specific famous actress (e.g., "Actress_ID" in relational graph 112) may return biographical data for that individual including filmography, family life, and more.

A relational graph merger 124 merges together the relational graph 112 and implicit relation data 122 pulled from the knowledge graph 114 to form a merged relational graph 126. In different implementations, the relational graph merger 124 may be leveraged in different ways.

In one implementation, the relational graph merger 124 merges data at the time that the video is placed in an indexed video database (not shown). For example, the relational graph 112 for each video is expanded and enriched with implicit relational data to form a merged relational graph 126 that is stored within a video database where it is essentially interlinked with a much larger graph including data pertaining to an expansive library of videos, subjects of those videos, and factual data (implicit relations) about those videos and video subjects. In this implementation, the video database may serve as an independent and comprehensive data source that can be searched to return videos and/or relevant portions of video in response to user queries that depend upon implicit relations.

In another implementation, data from the two graphs (e.g., the relational graph 112 and the knowledge graph 114) is merged dynamically by a query engine (not shown) at the time that a user search query is processed. For example, the system 100 may include a tool that transforms a natural-language user query into a query language (e.g., SPARQL) that exposes a declarative notation, such as a relational predicate graph structure, to represent the wanted type of results. A query language engine abstracts an algorithm executable to retrieve and merge the relevant data. If, for example, the user types "find videos of football players that played for Denver Broncos football team," the tool may transform this into SPARQL other database query language that is fed into a query engine capable of self-selecting an applicable algorithm to query multiple data sources (e.g., the knowledge graph 114 and a video database storing the relational graph 112) and to combine the data dynamically to identify and return relevant search results.

In the above example, the query engine may decide to first query the knowledge graph 114 to identify names of football players that have, throughout history, played for the Denver Broncos and then search a relational graph data in a video database for videos that have been stored in association with two or more of the identified names (e.g., because facial recognition software has correctly identified these faces at the time that descriptive metadata is generated by the descriptive metadata generator 104). Graph data from both of these queries is merged by the relational graph merger 124 to create the merged relational graph 126 that, in turn, includes relations that facilitate extraction of the relevant video results.

In one implementation, the descriptive metadata generator 104 adds a timestamp to each detection (e.g., person, place, thing, recognized action) and this timestamp is included within or in association with the corresponding node of the relational graph 112 for the video. Timestamping detections may further expand the above search capabilities by supporting queries on a chain of events such as "find all videos produced by [producer name] in which a gun was detected in the opening scene and fired in the closing scene," where [producer name] is a user-specified producer. In this case, the knowledge graph 114 may provide implicit relational data for the specified producer (e.g., the list of movies he/she produced) and this information can, in turn, be used to identify relational graph data for individual videos (e.g., the relational graph 112) that may contain descriptors and timestamps satisfying the temporal relation of interest for the subject of interest (e.g., the gun that is detected in the opening scene and fired in the closing scene).

In the above way, the construction of a video graph and expansion of that graph to include implicit relational data associated with the detections tagged in association with each video and/or video frame provides an infrastructure that supports queries that depend on a variety of references that are external to video content (and not discernable exclusively from analyzing the video file without referencing a secondary data source). This capability provides media companies with a powerful tool for identifying indexed video content relevant to their respective media and entertainment products.

Figure 2A:
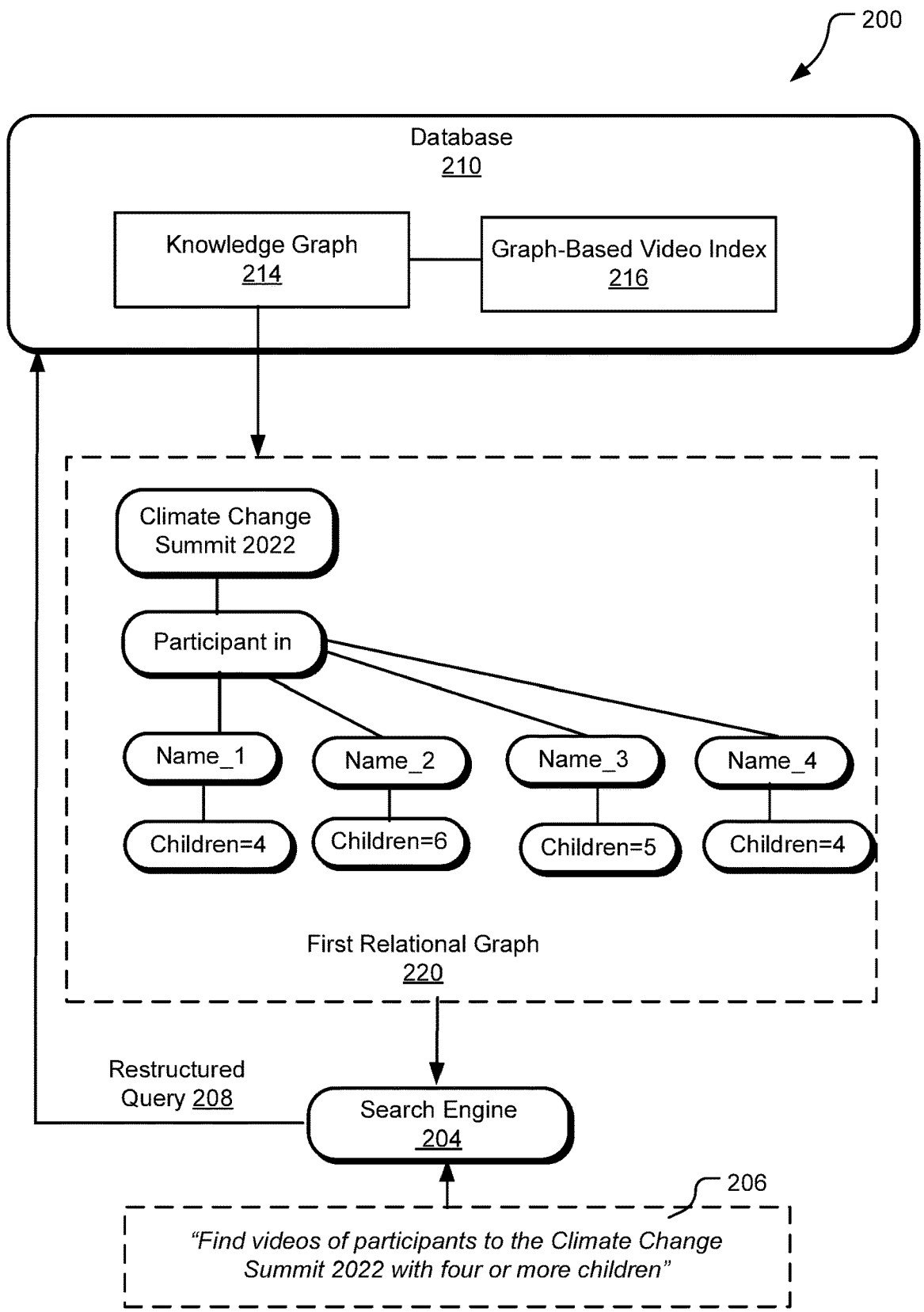
FIG. 2A illustrates example operations for creating relational graph data for a video that stores factual data about the video and the various detections made with respect to each frame of the video.
Figure 2B:
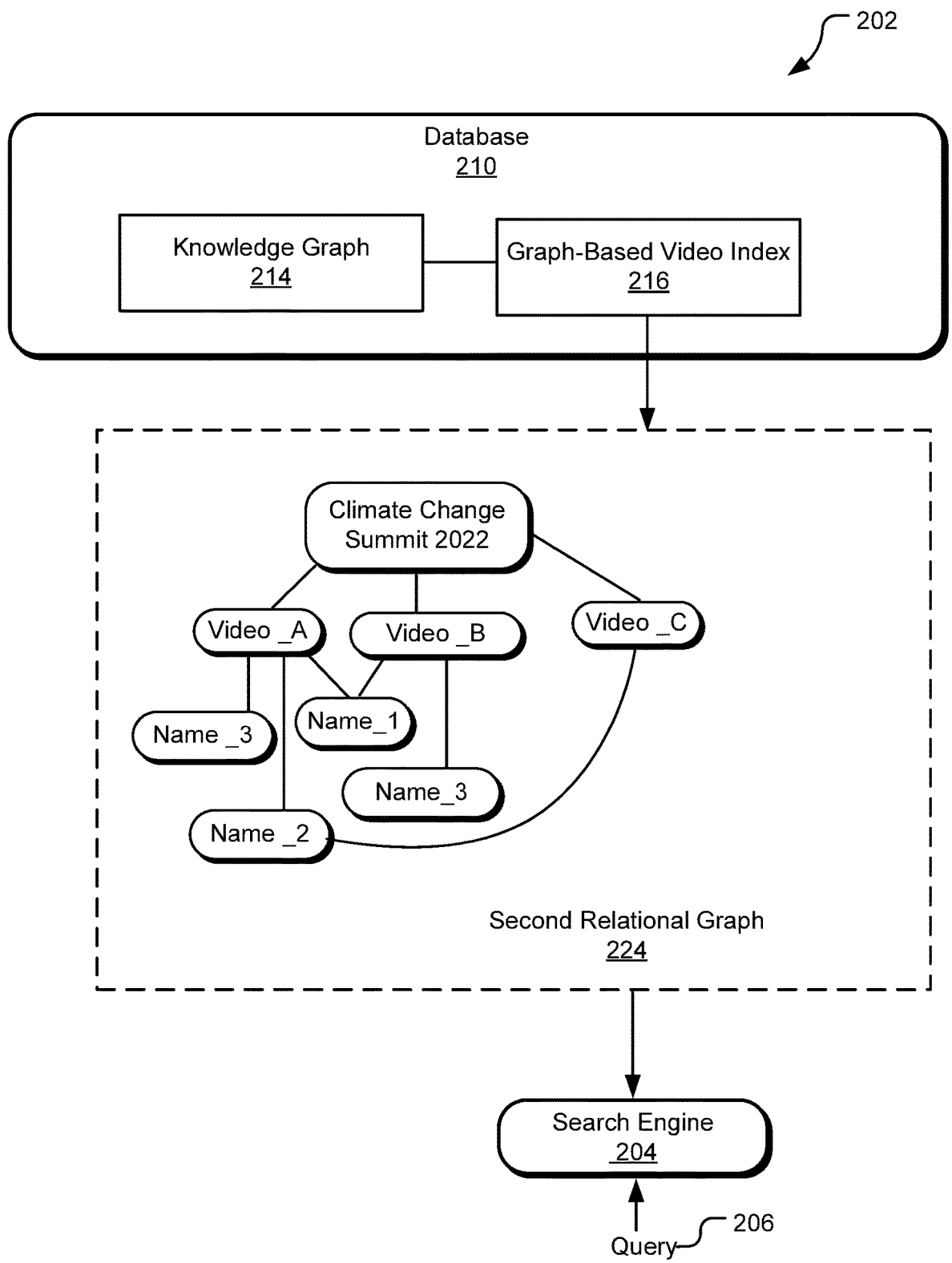
FIG. 2B illustrates example operations for enriching the relational graph data described with respect to FIG. 2A to incorporate implicit relations of the video and video detections.
Figure 2C:
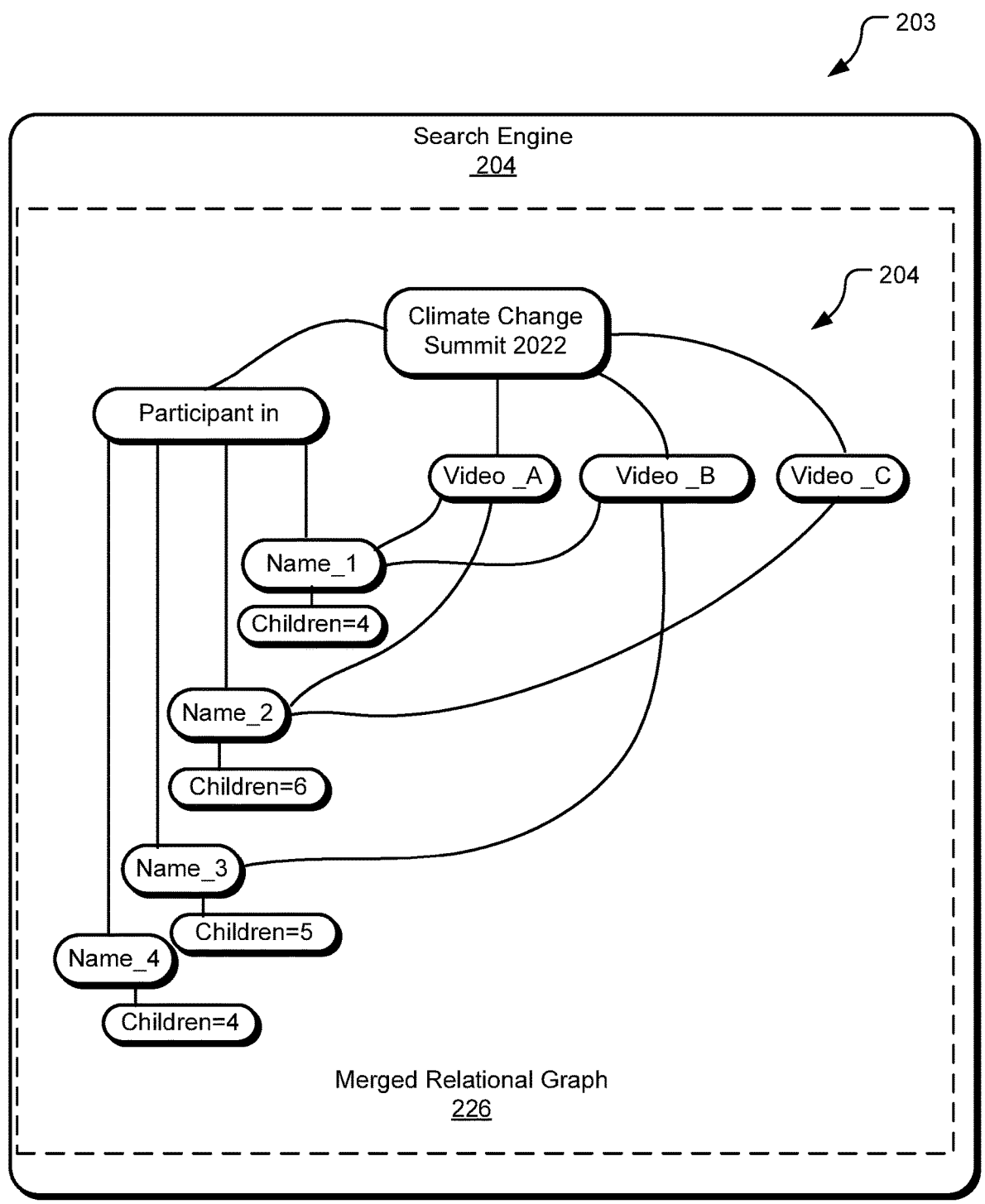
FIG. 2C illustrates still further example operations building on those described with respect to FIG. 2A-2B to form a merged relational graph.

FIG. 2A-2C illustrate example operations 200, 202, 204 for creating relational graph data for a video that stores factual data (e.g., implicit relations) about the video and the various detections made with respect to each frame of the video. The relational graph data can be used as a data source that supports implicit semantic referential querying to identify videos relevant to a query. For illustration of concept, the example of FIG. 2A-2C pertains to a scenario where a user has queried a search engine 204 with a query 206: "find videos of participants to the Climate Change Summit 2022 featuring people that have four or more children."

In one implementation, the query 206 is a natural language query and the search engine 204 applies Named Entity Linking (NEL) to generate a restructured query 208 that represents the query as a relational predicate graph structure with a unique identifier assigned to each component of the query. In this example, the search engine 204 applies an appropriate algorithm to determine unique identifiers used by the video database to represent each graphical component of the query. For example, the query 206 may be broken down into two separate queries of a general form array="participants of the Climate Change Summit 2022" and "result=members of (array) with at least four children." In this example, NEL is used to assign a unique identifier to each subject, predicate, and component of the query, and the result is represented as a graph-type structure that is of the same format as the desired information. In one example, this graph-type structure includes nodes that corresponding to the entities (subjects/objects) of the query 206, and edges representing relations. This graph-shaped piece of information is passed to a database 210 that joins a knowledge graph 214 (shown in FIG. 2A) and a graph-based video index 216. In another implementation, the query 206 is initially placed in a database query language, such as SPARQL.

In various implementations, the knowledge graph 214 and the graph-based video index 216 may be either a single, joined data source (e.g., merged at the time of indexing of each video) or two separate data sources that are independently queried to fetch complimentary data that is dynamically merged and analyzed to return relevant query results. The example below discusses the latter scenario where a video graph is dynamically constructed from two data sources at the time of query. It can be appreciated that the information retrieved in this way can likewise be retrieved from a single data source if relevant data for the two data sources were merged at the time of video indexing.

With respect to the example shown, FIG. 2A illustrates operations 200 for generating a first relational graph 220 including information that may initially reside in the knowledge graph 214 and be accessed and pulled from the knowledge graph 214 in response to the query 206 (e.g., "find videos of participants to the Climate Change Summit 2022 featuring people that have four or more children.") Specifically, the knowledge graph 114 stores an event node corresponding to "Climate Change Summit 2022" (e.g., corresponding to a Wikipedia entry for the event) that is linked to nodes corresponding to various individuals that participated in the event, where the event and each participant to the event is identified by a unique subject identifier (unique ID). After obtaining an array including the unique ID for each participant to the Climate Change Summit 2022, the search engine 204 queries the knowledge graph 114 with the unique IDs to retrieve implicit relational data for these subjects of interest, e.g., the number of children for each participant. In this example, the search returns a first relational graph 220 that includes the unique ID for each of the subjects of interest—e.g., participants to the Climate Change Summit 2022 that have four or more children. The format, content, and type of information retrieved may vary from one implementation to another.

FIG. 2B illustrates operations 202 for generating a second relational graph 224 including information that may initially reside in a graph-based video index 216 and be accessed in response to the query 206 (e.g., "find videos of participants to the Climate Change Summit 2022 featuring people that have four or more children"). The graph-based video database 216 stores relational graph data that is identical in structure to the knowledge graph 214 and that uses a common set of unique IDs as node identifiers. In one implementation, the graph-based video index 216 stores relational graph data for each of multiple videos—either as a number of separate graphs or a single graph that conjoins data associated with of many different videos. The relational graph data within the graph-based video index 216 includes video nodes that each corresponding to an indexed video. The video nodes are each individually linked to detection nodes that represent the detections made (e.g., by the descriptive metadata generator 104 of FIG. 1) with respect to one or more frames of the associated video.

In the example of FIG. 2B, example relational data pulled from the graph-based video index 216 is shown within a second relational graph 224. Specifically, the second relational graph 220 includes a node 222 that includes the unique ID for the event "Climate Change Summit 2022." In one implementation, the unique ID for this event is the same as the unique ID used to refer to the same event within the knowledge graph 214. The second relational graph 224 further includes video nodes corresponding to the videos associated with this event (e.g., tagged with "Climate Change Summit 2022" in the corresponding metadata) and detection nodes that each correspond to a detection made with respect to one or more frames of each associated video. These detection nodes include, among other information, the names of subjects that have been recognized within each video, for example, by facial recognition software (e.g., Name_1, Name_2, Name_3, Name_4).

In an implementation where the graph-based video index 216 is queried in parallel with the knowledge graph 214, the second relational graph 224 includes nodes pertaining to all participants in the conference (e.g., a dataset that can be meaningfully filtered based on the specific participant identifiers returned in the query illustrated with respect to FIG. 2A).

As the second relational graph 224 stores data in the same format as the first relational graph 206, the graphs can be logically "merged" to provide a complete data source usable to extract meaningful results for the query 206.

FIG. 2C illustrates an example operation 206 performed by the search engine 206 to generate a merged relational graph 226 including video nodes, associated subject identifiers (detections), and implicit relations usable to answer the query in the example of FIG. 2A-2B (e.g., "find videos of participants to the Climate Change Summit 2022 featuring people that have four or more children"). Specifically, the merged relational graph 226 is formed by combining the information included in the first relational graph 220 of FIG. 2A and the second relational graph 224 of FIG. 2B such that the resulting graph includes nodes corresponding to the relevant video identifiers, subject identifiers (unique IDs) and also other nodes that provide implicit relational data (factual information) pertaining to the subject and video identifiers. Creating the merged relational graph 226 entails combining nodes with common identifiers (e.g., deduplicating) and potentially filtering irrelevant nodes, such as the subset of nodes corresponding to participants of the conference that have fewer than four children (e.g., a fact identified from the first relational graph 206).

From the merged relational graph 226, it can be seen that four conference participants have four or more children. A first one of these participants appears in both Video_A and Video_B, a second one of these participants appears in both Video_A and Video_C, a third one of these participants appears in Video_B, and a fourth one of these participants (Name_4) is not included in any of the indexed videos. The search engine can, at this point, identify Video_A, Video_B, and Video_C as relevant, and return links to these videos and/or specific locations in these videos that include the subjects of interest (e.g., the participants to the Climate Change Summit 2022 with four or more children).

In the illustrated implementation, the merged relational graph 226 is generated dynamically in response to a user query. In other implementations, the merged relational graph 226 is generated at the time of video indexing. Example systems implementing each of these alternative approaches are shown in FIGS. 3 and 4.

Figure 3:
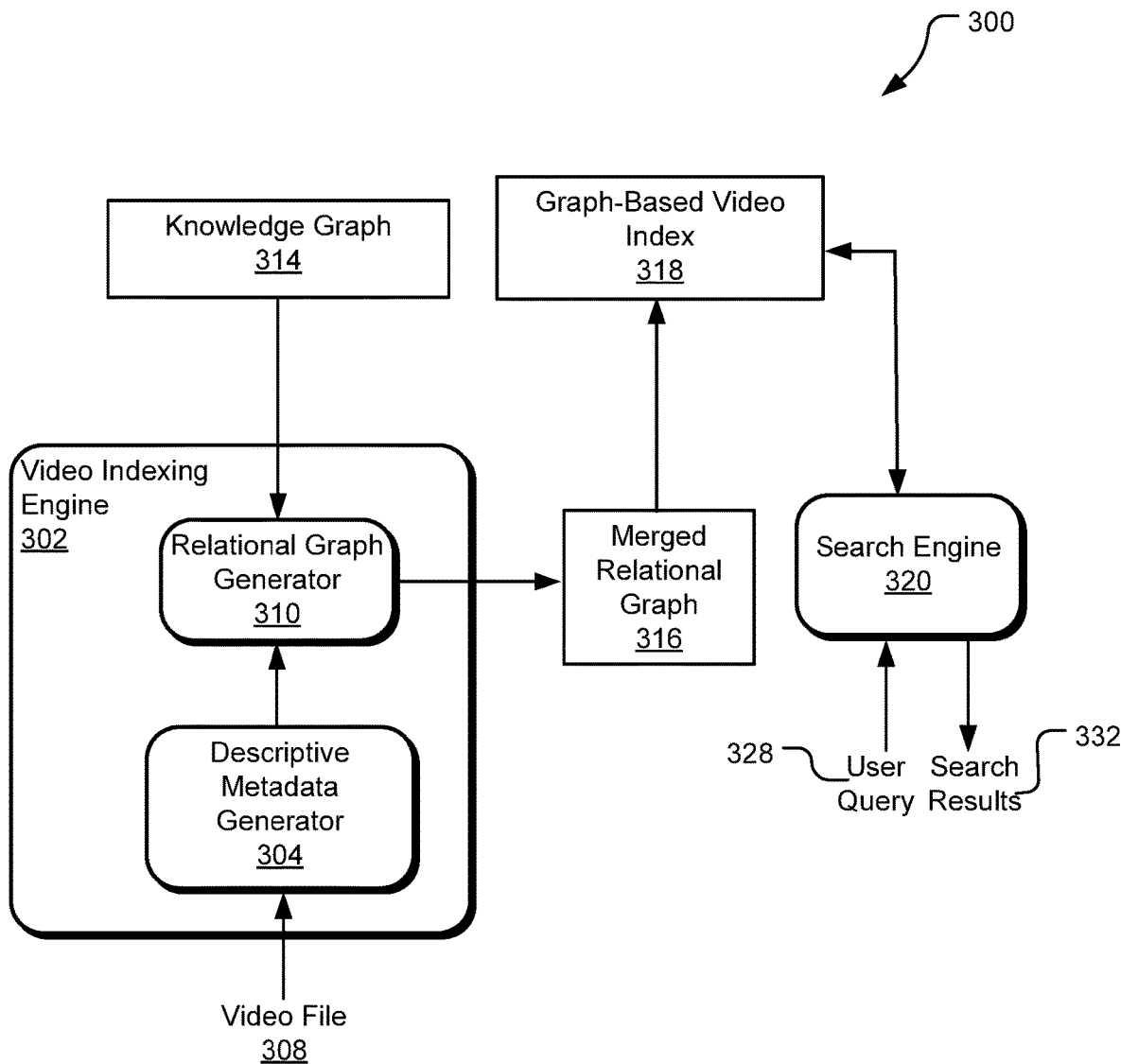
FIG. 3 illustrates an architecture for an example system that supports searching based on implicit relations pertaining to videos and the subjects featured in those videos.
Figure 4:
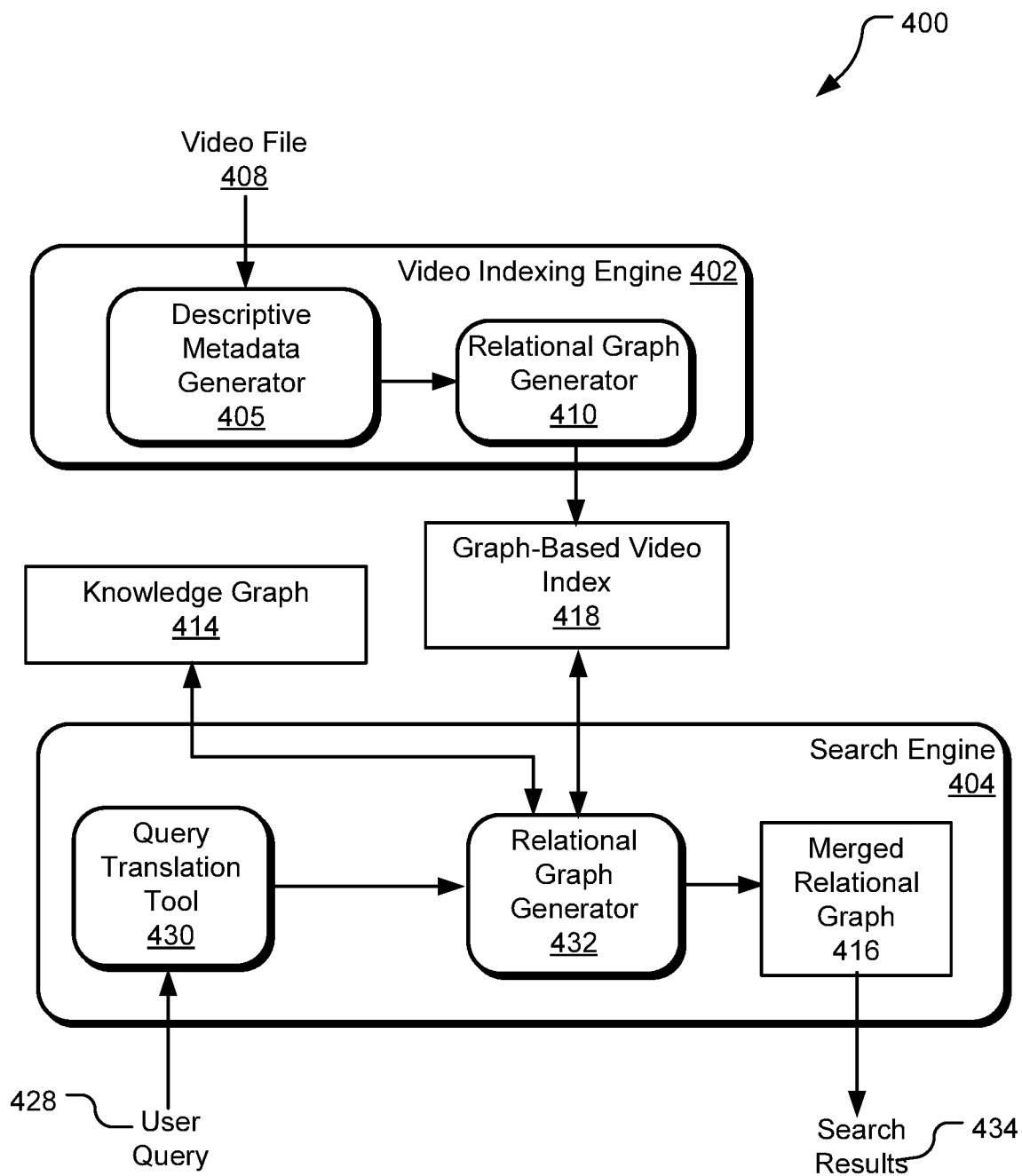
FIG. 4 illustrates an architecture for another example system that supports searching based on implicit relations pertaining to videos and the subjects featured in those videos.

FIG. 3 illustrates an architecture for an example system 300 that supports searching based on implicit relations pertaining to videos and the subjects featured in those videos. Specifically, the system 300 generates and stores relational graph data for each of multiple videos. The relational graph data includes nodes pertaining to videos, video detections, and various subjects (e.g., objects, people) explicitly or implicitly associated with each of the videos and each of the video detections, as well as the nature of each association (e.g., relationship) between nodes. Examples of various types of relational graph data are shown herein with respect to FIG. 2A-2C.

The system 300 includes a video indexing engine 302 that includes a descriptive metadata generator 304 that generates descriptive metadata for each video file received as an input (e.g., video file 308). The descriptive metadata generator 304 includes various AI models that perform actions to detect video content and to tag each resulting "detection" with a unique identifier corresponding to a recognized subject, object/thing, place, or action depicted in a single video frame. Other implementations do not include the descriptive metadata generator 304. For example, metadata is added to the video by alternative means, such as manually.

The video indexing engine 302 further includes a relational graph generator 310 that transforms the metadata generated by the descriptive metadata generator 304 include a relational graph of a form used within a knowledge graph 314. In one implementation, the knowledge graph 314 and the relational graph generator 310 implement an RDF graph model that use a common set of unique identifiers to refer to each entity (e.g., node on the graph).

In addition to receiving the descriptive metadata for each video, the relational graph generator 310 also receives, as an input, certain implicit relational data for the video that is pulled from the knowledge graph 314. In one implementation, the video indexing engine 302 queries the knowledges graph 314 with the unique IDs for each of the nodes in the relational graph that has been generated from the descriptive metadata for the video 108 (e.g., IDs referring to the video and to each of the video detections). In response, implicit relational data is retrieved from the knowledge graph 314 and incorporated, by the relational graph generator 310, into the relational graph, forming a merged relational graph 316. This implicit relational data includes factual data about the video file 308 and/or the detections identified within the various frames of the video file 308.

The relational graph generator 310 indexes the merged relational graph 316 in a graph-based video index 318 in association with the video file 308. In one implementation, storing the merged relational graph 316 in the video database includes merging the relational graph 316 with other graphs of a common format previously created with respect to each of multiple other videos. For example, nodes having identical identifiers are merged and deduplicated such that the graph-based video index 318 stores a single, complex graph that interlinks the video IDs, detections IDs, and objects of implicit relational facts of many different videos, which may all be connected in various ways to one another.

Due to the graph-like architecture of stored data and extensive breadth of implicit relational data within the graph-based video index 318, a search engine 320 can query the graph-based video index 318 to return meaningful results in response to user queries that depend on implicit relations of various video subjects of interest.

The search engine 320 may receive a user query 328 that specifies one or more subjects of interest and an implicit relation for pertaining to at least one of the subject of interest (and/or relating two subjects of interest to one another). For example, if the user query 328 specifies: "find videos featuring actors that have won a Best Picture Oscar award," the subject(s) of interest include an unspecified set of actors (to be identified through analysis performed by the search engine 320, and the implicit relation is an award that those actors have won. Alternatively, if the user query 328 requests videos "filmed within 10 miles of Lake Superior," the subject of interests include a set of locations and landmarks within a specified geographic area, while the implicit relation is that the filming location of the video corresponds to one of the locations in the specified geographic area.

By analyzing the relational data stored in the graph-based video index 318, the search engine 320 is able to identify, for each of the above example queries, a set of videos featuring instances of the subject of interest (e.g., actors, the filming locations) that are characterized by the implicit relation (e.g., Oscar-winner, filming location in the location(s)) and return a set of search results 332 that identify the set of videos and/or specific frames or groups of frames within the videos that feature the subject of interest.

Other aspects of FIG. 3 not explicitly described above may be the same or similar as that described elsewhere herein.

FIG. 4 illustrates an architecture for another example system 400 that supports searching based on implicit relations pertaining to videos and the subjects featured in those videos. In contrast to the system of FIG. 3 that generates relational graph data with implicit relations at the time of video indexing, the system 400 generates the same or similar data dynamically, by merging query results from multiple data sources, in response to a user query.

Like the system 300 of FIG. 3, the system 400 includes a video indexing engine 402 with software components that perform functions similar to those described with respect to the video indexing engine of FIG. 3, which optionally includes a descriptive metadata generator 404 that analyzes a video file 408 to identify and tag "detections" within each video frame (e.g., using various AI models, as described elsewhere herein). The video indexing engine 402 further includes a relational graph generator 410 that restructures the descriptive metadata generated by the descriptive metadata generator 405 into a relational graph with a node corresponding to the video as an entity and other nodes corresponding to each of the detections within various frames of the video file. The relational graph represents relations via connections between nodes and, in some implementations, represents relationship types in nodes as well (e.g., nodes that adjoin other nodes and represent their respective relationships with one another). The relational graph generated by the relational graph generator 410 is stored in a graph-based video index 418.

In contrast with the system of FIG. 3, the relational graph generator 410 does not perform actions to "merge" data from a knowledge graph 414 with the relational graph generated from the descriptive metadata. Consequently, the graphical data stored in the graph-based video index 418 is limited to explicit factual information that can be generated by analyzing the video file 408 without reference to an external data source.

The system 400 includes a search engine 404 that performs operations to retrieve and present search results 434 in response to a user query 428, which is, for example, a natural language query. In an example implementation, the user query 428 specifies an implicit relation for a subject of interest, and the search engine 404 performs actions to retrieve and merge relational graph data from the knowledge graph 414 and the graph-based video index 418 to identify the search results 434.

The search engine 404 includes a query translation tool 430 that transforms the user query 428 into a restructured query of a database query language (e.g., SPARQL) that may, for example, embody a relational predicate graph structure consistent with a structure of results that are to be retrieved from the knowledge graph 414 and the graph-based video index 418.

In one implementation, the restructured query formulated by the query translation tool 420 is passed to a relational graph generator 432 that retrieves and merges graphical data stored in the two data sources (e.g., knowledge graph 414 and the graph-based video index 418). In one implementation, the relational graph generator 432 abstracts an appropriate algorithm for cross-referencing the two data sources for different types of information pertinent to the user query 428. For example, the abstracted algorithm may set forth a querying order with respect to the different components of the restructured query. For instance, if the user query 428 is: "show me videos featuring actors that have won an Oscar and a Grammy," the relational graph generator 432 may abstract an algorithm that provides for querying the knowledge graph 414 for a list of Oscar winners and a list of Grammy Winners, as well as executable logic for cross-referencing the two lists to identify video subjects of interest (and their unique identifiers) and for then querying the graph-based video index 418 with those unique identifiers to identify video content potentially relevant to the user query 428. In this way, the query translational tool 420 and relational graph generator 432 may work in conjunction to translate the user query 428 into any number of single data source queries that retrieve complementary graphical information combined to form the merged relational graph 416.

The search engine 404 then parses and analyzes the merged relational graph 416 to identify videos and/or video timestamps (e.g., frame numbers) that feature instances of the subject of interest specified in the user query 428 that are characterized by the implicit relation specified in the user query 428. For example, the merged relational graph 416 is analyzed to identify a complete set of actors that have won both an Oscar and a Grammy and to identify videos feature those actors (e.g., featuring instances of the subject of interest characterized by the implicit relation of interest).

Other aspects of the system 400 not explicitly described herein may be assumed the same or similar as other as that described elsewhere with respect to other implementations.

Figure 5:
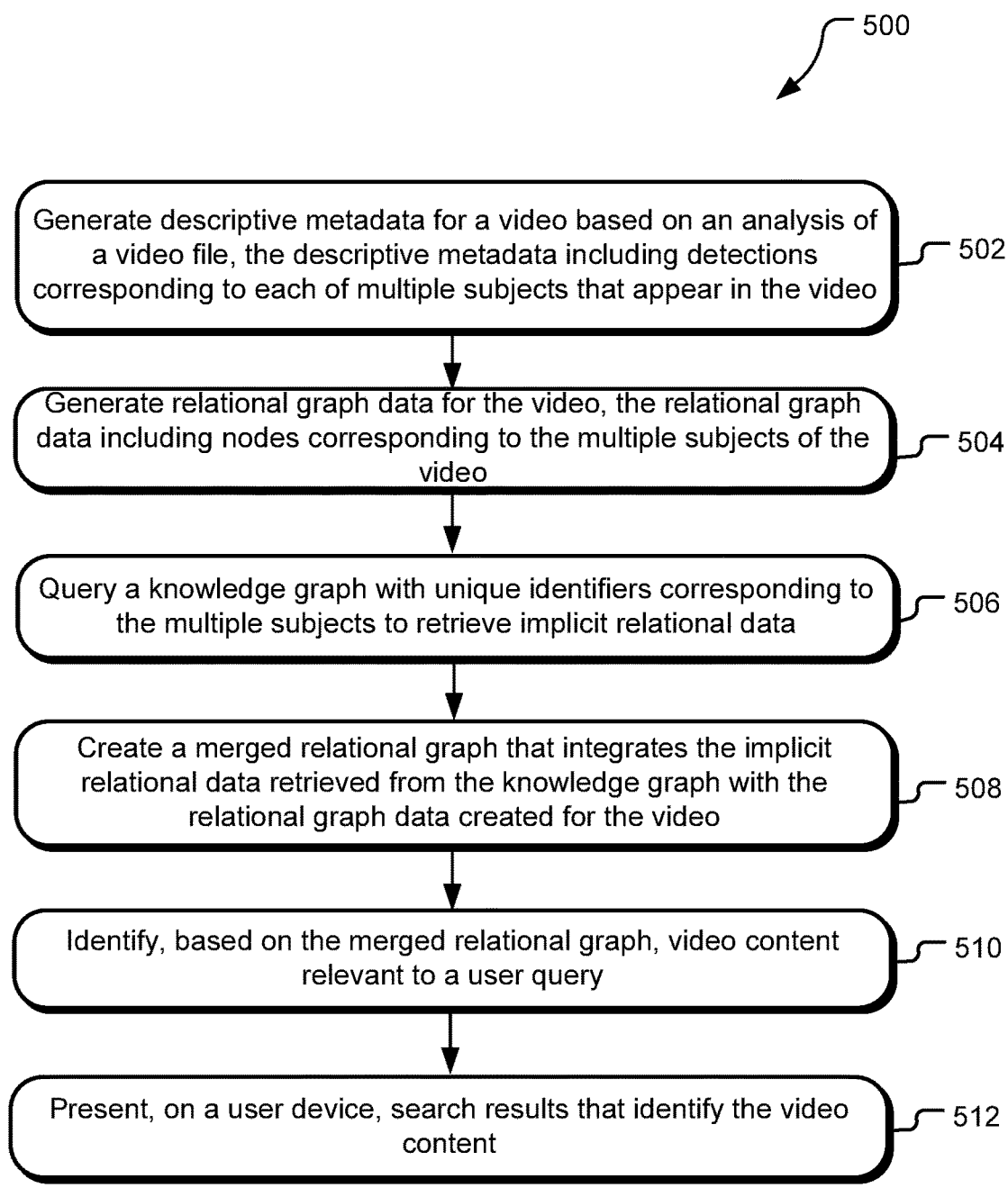
FIG. 5 illustrates example operations for generating search results based on relational graph data that incorporates implicit relational data for videos and video subjects.

FIG. 5 illustrates example operations 500 for video indexing and user query translation to support querying based on implicit relations of videos and video subjects. Optionally, a first data generation operation 502 generates descriptive metadata for a video based on analysis of a video. In some implementations, descriptive metadata is not added to the video at the time of video indexing. For example, metadata may already exist within the video, such as in scenarios where descriptive metadata is added by the original content creator. In one implementation, the metadata is generated without analyzing any data sources external to the video itself (e.g., the video, audio, subtitle components of a video file). The descriptive metadata is generated in ways consistent with other descriptions provided herein and identifies "detections" that each correspond to one of multiple subjects identified within the video. A single subject may be associated with several detections (e.g., each detection corresponding to a single frame of the video file).

A second data generation operation 504 generates relational graph data for the video. In one implementation, the relational graph data includes data organized according to a common graph model, such as RDF data. The relational graph data includes nodes corresponding to the multiple subjects captured in the detections of the video file.

A querying operation 506 queries a knowledge graph with unique identifiers corresponding to the multiple subjects to retrieve implicit relational data associated with each of the multiple subjects. In one implementation, the implicit relational data sourced from the knowledge graph is of a common format as the relational graph data generated in the second data generation operation 504. The implicit relational data and the generated relational graph data may also implement a common identifier scheme to refer to various entities (e.g., video subjects).

A merged graph creation operation 508 merges the implicit relational data retrieved from the knowledge graph with the relational graph data created for the video to form a merged relational graph. In one implementation, this merged relational graph is performed dynamically, in response to a user query, by combining the implicit relational data sourced from the knowledge graph with the relational graph data that is sourced from a graph-based video index. In another implementation, the merged relational graph is created at the time of video indexing and stored in a graph-based video index.

An identification operation 510 identifies, based on the merged relational graph, video content that is relevant to a user query. The video content that is relevant may, for example, include a specific subset of frames in the video in which a subject of interest appears. Alternatively, the video content that is relevant may include the entire video and one or more other videos that are also indexed in association with relational graph data (e.g., all graphs may be merged into a single queryable knowledge graph). In one implementation, the user query specifies an implicit relation of a subject of interest and the identification operation 510 further includes determining, from the merged relational graph, that the video features an instance of a subject of interest characterized by the implicit relation. The video is, in this case, included in the search results returned in response to the query.

A presentation operation 512 presents, on a user device, the search results that identify the video content deemed relevant to the user query.

Figure 6:
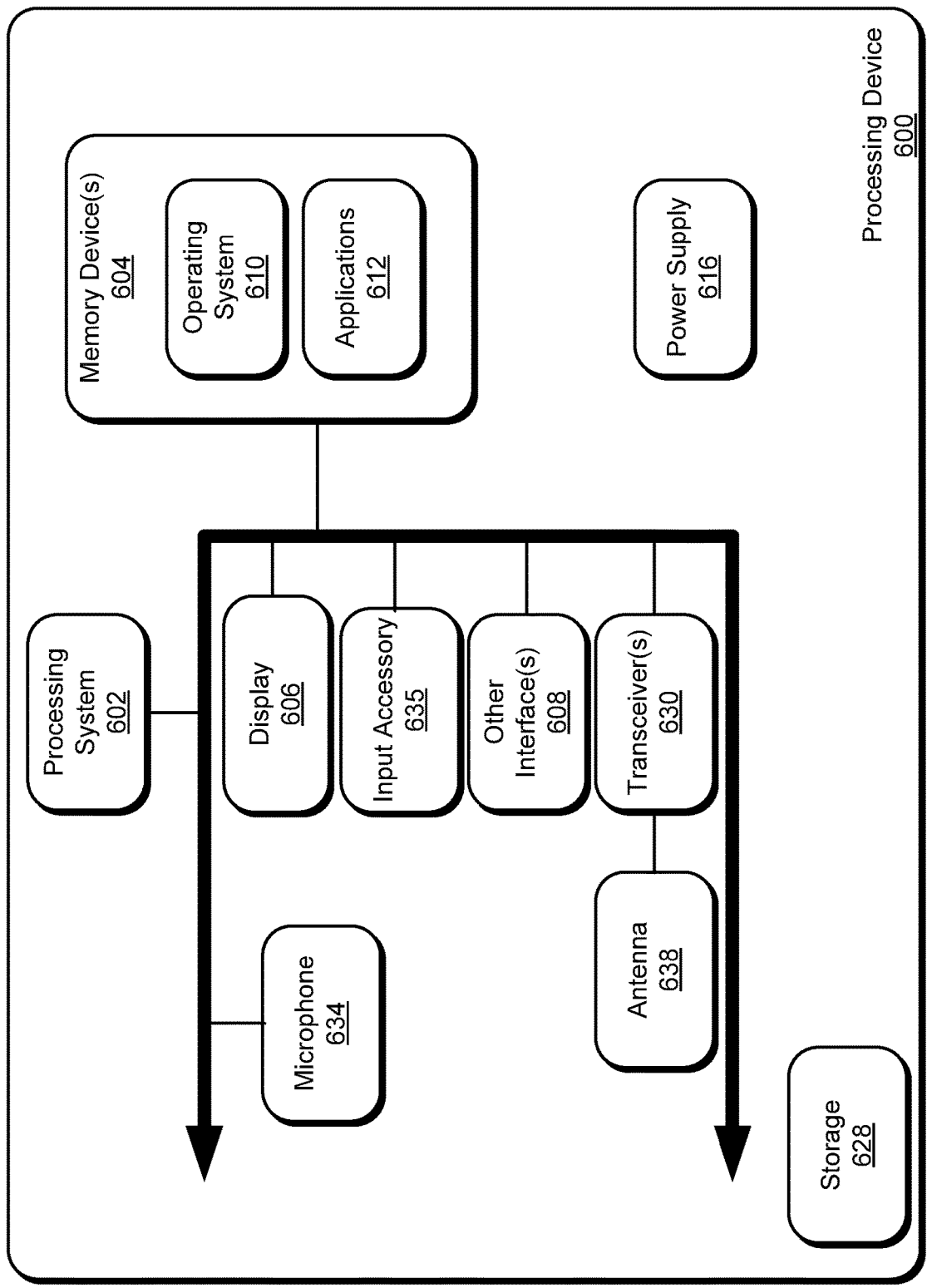
FIG. 6 illustrates an example processing device suitable for implementing aspects of the disclosed technology.

FIG. 6 illustrates an example schematic of a processing device 600 suitable for implementing aspects of the disclosed technology. The processing devices 600 includes processing system 602 comprising one or more processor unit(s), memory device(s) 604, a display 606, and other interfaces 608 (e.g., buttons). The processor unit(s) may each include one or more computer processing units (CPUs), and graphics processing units (GPUs), etc.

The memory 604 generally includes both volatile memory (e.g., RAM) and non-volatile memory (e.g., flash memory). An operating system 610, such as the Microsoft Windows® operating system, the Microsoft Windows® Phone operating system, a MacOS® operating system, iOS® operating system, or a specific operating system designed for a gaming device, may reside in the memory 604 and be executed by the processing system 602, although it should be understood that other operating systems may be employed.

One or more applications 612 (e.g., the descriptive metadata generator 104, the relational graph generator 110, the search engine 204, or video indexing engine 302) are loaded in the memory 604 and executed on the operating system 610 by the processing system 602. The applications 612 may receive inputs from one another as well as from various input local devices such as a microphone 634, input accessory 635 (e.g., keypad, mouse, stylus, touchpad, gamepad, racing wheel, joystick), and a camera 632. Additionally, the applications 612 may receive input from one or more remote devices, such as remotely-located smart devices, by communicating with such devices over a wired or wireless network using more communication transceivers 630 and an antenna 638 to provide network connectivity (e.g., a mobile phone network, Wi-Fi®, Bluetooth®). The processing device 600 may also include one or more storage devices 628 (e.g., non-volatile storage). Other configurations may also be employed.

The processing device 600 further includes a power supply 616, which is powered by one or more batteries or other power sources and which provides power to other components of the processing device 600. The power supply 616 may also be connected to an external power source (not shown) that overrides or recharges the built-in batteries or other power sources.

The processing device 600 may include a variety of tangible computer-readable storage media and intangible computer-readable communication signals. Tangible computer-readable storage can be embodied by any available media that can be accessed by the processing device 600 and includes both volatile and nonvolatile storage media, removable and non-removable storage media. Tangible computer-readable storage media excludes intangible and transitory communications signals and includes volatile and nonvolatile, removable, and non-removable storage media implemented in any method or technology for storage of information such as computer readable instructions, data structures, program modules or other data. Tangible computer-readable storage media includes random access memory (RAM), read-only memory (ROM), electrically erasable programmable read-only memory (EEPROM), flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing device 600. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, intangible communication signals include wired media such as a wired network or direct-wired connection, and wireless media such as acoustic, radio frequency (RF), infrared and other wireless media.

Some implementations may comprise an article of manufacture. An article of manufacture may comprise a tangible storage medium (a memory device) to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

An example method for video indexing disclosed herein provides for retrieving implicit relational data for each of multiple subjects in a video by querying a knowledge graph with unique identifiers corresponding to the multiple subjects of the video and for creating a merged relational graph by merging the implicit relational data retrieved from the knowledge graph with relational graph data created for the video. The method further provides for identifying, based on the merged relational graph, video content relevant to a query that references an implicit relation for a select subject of interest and for providing search results that identify the video content.

In another example method of any preceding method, the method further comprises generating descriptive metadata for the video, and for generating relational graph data for the video. The descriptive metadata includes detections corresponding to each of the multiple subjects that appear in the video, and the relational graph data including nodes corresponding to the multiple subjects of the video.

In still another example method of any preceding method, the relational graph data for the video and the knowledge graph implement a common graph model and utilize a common identifier scheme.

In another example method of any preceding method, the method further comprises determining, from the merged relational graph, that the video features an instance of the select subject of interest. The instance is characterized by the implicit relation, and the video is included in the search results.

In still another example method of any preceding method, the query specifies a temporal relation between two instances of a subject of interest and the video content presented in the search results includes a select video with two instances of the subject of interest, in different frames, satisfying the temporal relation.

In another aspect, some implementations include a computing system that performs video indexing operations. The computing system includes hardware logic circuitry that is configured to perform any of the methods described herein.

In yet another aspect, some implementations include a computer-readable storage medium for storing computer-readable instructions. The computer-readable instructions, when executed by one or more hardware processors, perform any of the methods described herein.

The logical operations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of example implementations.

What is claimed is:

1. A method comprising:
creating a merged relational graph by:
obtaining relational graph data created for a video, the relational graph data including a video node identifying video subject nodes that identify multiple subjects of the video;
retrieving implicit relational data for each of the multiple subjects identified in the relational graph data by querying a knowledge graph with unique identifiers corresponding to the multiple subjects; and
merging the implicit relational data retrieved from the knowledge graph with the relational graph data created for the video;
indexing the merged relational graph in a video-based database by combining the merged relational graph with other graphs of common format previously created for other videos;
receiving a video search query via a search interface, the video search query specifying an implicit relation identifying a fact satisfied by video content that is not evident from viewing the video content without access to an external data source;
identifying, based on the merged relational graph, the video content that is characterized by the implicit relation; and
providing, responsive to the query via the search interface, search results that identify the video content.

2. The method of claim 1, further comprising:
generating descriptive metadata for the video, the descriptive metadata including detections corresponding to each of the multiple subjects that appear in the video; and
generating the relational graph data for the video.

3. The method of claim 1, wherein the relational graph data for the video and the knowledge graph implement a common graph model and utilize a common identifier scheme.

4. The method of claim 3, further comprising:
determining, from the merged relational graph, that the video features an instance of a select subject of interest referenced in the video search query, the instance being characterized by the implicit relation; and
including the video in the search results.

5. The method of claim 1, wherein the video search query specifies a temporal relation between two instances of a subject of interest and the video content presented in the search results includes a select video with two instances of the subject of interest, in different frames, satisfying the temporal relation.

6. The method of claim 4, wherein the merged relational graph is created dynamically in response to receipt of the video search query by performing a joint query on multiple data sources.

7. The method of claim 4, wherein the search results identify a location within the video featuring the instance of the select subject of interest.

8. A system comprising:
memory;
a processing system;
a relational graph generator stored in the memory and executable by the processing system to:
create a merged relational graph by:
generating relational graph data for a video, the relational graph data including a video node identifying video subject nodes that identify to multiple subjects of the video;
retrieving implicit relational data for each of the multiple subjects identified in the relational graph data by querying a knowledge graph with unique identifiers corresponding to the multiple subjects; and
merging the implicit relational data retrieved from the knowledge graph with the relational graph data created for the video; and
index the merged relational graph in a video-based database by combining the merged relational graph with other graphs of common format previously created for other videos;
a search engine stored in memory and executable by the processing system to:
receive a video search query via a search interface, the video search query specifying an implicit relation identifying a fact satisfied by video content that is not evident from viewing the video content without access to an external data source;
identify, based on the merged relational graph, the video content that is characterized by the implicit relation; and
provide, responsive to the video search query via the search interface, search results that identify the video content.

9. The system of claim 8, further comprising:
a descriptive metadata generator stored in the memory and executable by the processing system to generate descriptive metadata for the video, the descriptive metadata including detections corresponding to each of the multiple subjects that appear in the video.

10. The system of claim 8, wherein the relational graph data for the video and the knowledge graph implement a common graph model and utilize a common identifier scheme.

11. The system of claim 8, wherein the search engine is further executable to:
determine, from the merged relational graph, that the video features an instance of a select subject of interest referenced in the video search query, the instance being characterized by the implicit relation; and
include the video in the search results.

12. The system of claim 8, wherein the relational graph generator creates the merged relational graph in response to receipt of the video search query.

13. The system of claim 11, wherein the search results identify a location within the video featuring the instance of the select subject of interest.

14. A tangible computer-readable storage media storing processor-executable instructions for executing a computer process, the computer process comprising:
generating descriptive metadata for a video, the descriptive metadata including detections corresponding to each of multiple subjects that appear in the video;
receiving a query via a search interface, the query specifying an implicit relation identifying a fact satisfied by video content that is not evident from viewing the video content without access to an external data source;
identifying, based on a merged relational graph, the video content that is characterized by the implicit relation, the merged relational graph including relational graph data including nodes corresponding to the multiple subjects that appear in the video and implicit relational data from a knowledge graph that pertains to each of the multiple subjects identified in the relational graph data; and providing, responsive to the query via the search interface, search results that identify the video content.

15. The tangible computer-readable storage media of claim 14, wherein the relational graph data for the video and the knowledge graph implement a common graph model and utilize a common identifier scheme.

16. The tangible computer-readable storage media of claim 14, wherein the computer process further comprises:

determining, from the merged relational graph, that the video features an instance of a select subject of interest referenced in the query, the instance being characterized by the implicit relation; and including the video in the search results.

17. The tangible computer-readable storage media of claim 14, wherein the creating of the merged relational graph occurs in response to receiving of the query.

* * * * *